United States Patent
Kato et al.

(10) Patent No.: US 10,985,991 B2
(45) Date of Patent: *Apr. 20, 2021

(54) RELAY DEVICE, PROGRAM, AND DISPLAY CONTROL METHOD

(71) Applicant: Yamaha Corporation, Hamamatsu (JP)

(72) Inventors: Hiroaki Kato, Kikukawa (JP); Yoshimitsu Nishihara, Kakegawa (JP)

(73) Assignee: Yamaha Corporation, Hamamatsu (JP)

( * ) Notice: Subject to any disclaimer, the term of this patent is extended or adjusted under 35 U.S.C. 154(b) by 65 days.

This patent is subject to a terminal disclaimer.

(21) Appl. No.: 16/451,306

(22) Filed: Jun. 25, 2019

(65) Prior Publication Data

US 2019/0312788 A1    Oct. 10, 2019

Related U.S. Application Data

(63) Continuation of application No. 15/367,880, filed on Dec. 2, 2016, now Pat. No. 10,491,480, which is a
(Continued)

(30) Foreign Application Priority Data

Jun. 2, 2014  (JP) ................................. 2014-114445

(51) Int. Cl.
*H04L 12/24*    (2006.01)
*H04L 12/46*    (2006.01)
(Continued)

(52) U.S. Cl.
CPC .......... *H04L 41/12* (2013.01); *H04L 12/2801* (2013.01); *H04L 12/44* (2013.01); *H04L 12/46* (2013.01); *H04L 41/22* (2013.01)

(58) Field of Classification Search
CPC ......... H04L 41/12; H04L 41/14; H04L 41/22; H04L 12/2801; H04L 12/44; H04L 12/46; H04L 12/4616

See application file for complete search history.

(56) References Cited

U.S. PATENT DOCUMENTS 5,586,254 A * 12/1996 Kondo ................ H04L 41/0846
714/25
5,684,967 A * 11/1997 McKenna ............... H04L 41/22
345/696

(Continued)

FOREIGN PATENT DOCUMENTS

CN          102934398 A      2/2013
JP       2001-256153 A      9/2001
(Continued)

OTHER PUBLICATIONS

Japanese-language Office Action issued in Japanese Application No. 2018-208875 dated Jun. 30, 2020 with English translation (six pages).

(Continued)

*Primary Examiner* — Kevin D Mew
(74) *Attorney, Agent, or Firm* — Crowell & Moring LLP

(57) ABSTRACT

A relay device acquires network topology data representing a network topology that includes a connection relationship of each relay device and a connection relationship of a terminal device connected to each relay device in a local area network (LAN), and displays, on a display device, an image of a tree structure in which each relay device included in the LAN corresponds to a node, as an image of the network topology represented by the acquired network topology data. The relay device displays, on the display device, the image of the tree structure in which a node corresponding to a relay device designated in advance among the relay devices included in the LAN and nodes of up to directly below the designated node are set as a drawing target.

18 Claims, 5 Drawing Sheets

Related U.S. Application Data continuation of application No. PCT/JP2015/065954, filed on Jun. 2, 2015.

(51) Int. Cl.
*H04L 12/28* (2006.01)
*H04L 12/44* (2006.01)

(56) References Cited

U.S. PATENT DOCUMENTS

| | | | | |
|---|---|---|---|---|
| 5,910,803 | A * | 6/1999 | Grau | H04L 41/12 709/224 |
| 6,012,095 | A * | 1/2000 | Thompson | H04L 41/0213 709/231 |
| 7,036,119 | B1 | 4/2006 | Chen | |
| 7,466,710 | B1 * | 12/2008 | Clemm | H04L 41/0873 370/401 |
| 7,866,031 | B2 | 1/2011 | Stoving | |
| 7,990,897 | B2 * | 8/2011 | Jing | H04W 40/248 370/255 |
| 8,483,088 | B1 | 7/2013 | Margalit | |
| 8,934,495 | B1 * | 1/2015 | Hilton | H04L 43/028 370/401 |
| 2001/0046231 | A1 | 11/2001 | Hirasawa | |
| 2003/0009547 | A1 * | 1/2003 | Benfield | H04L 41/0233 709/223 |
| 2003/0101253 | A1 * | 5/2003 | Saito | H04L 67/14 709/223 |
| 2004/0090925 | A1 | 5/2004 | Schoeberl et al. | |
| 2004/0215649 | A1 | 10/2004 | Whalen | |
| 2005/0125492 | A1 * | 6/2005 | Yu | H04L 41/0806 709/203 |
| 2005/0270986 | A1 * | 12/2005 | Watanabe | H04L 41/12 370/252 |
| 2006/0002311 | A1 * | 1/2006 | Iwanaga | H04L 12/4675 370/254 |
| 2006/0014562 | A1 * | 1/2006 | Syrtsov | H04L 41/0893 455/556.2 |
| 2006/0126534 | A1 * | 6/2006 | Huibregtse | H04L 12/4641 370/254 |
| 2006/0168205 | A1 | 7/2006 | Barron | |
| 2006/0200535 | A1 | 9/2006 | Moser | |
| 2006/0220876 | A1 * | 10/2006 | Campero | G06K 17/0022 340/572.7 |
| 2007/0014233 | A1 | 1/2007 | Oguro et al. | |
| 2007/0038743 | A1 * | 2/2007 | Hellhake | H04L 29/12283 709/224 |
| 2007/0115967 | A1 * | 5/2007 | Vandenberghe | H04L 41/12 370/389 |
| 2007/0177600 | A1 * | 8/2007 | Suzuki | H04L 43/00 370/392 |
| 2007/0208840 | A1 | 9/2007 | Mcconville | |
| 2008/0040661 | A1 | 2/2008 | Curtis et al. | |
| 2008/0263615 | A1 * | 10/2008 | Kashihara | H04N 21/2402 725/127 |
| 2008/0291848 | A1 | 11/2008 | Hirano | |
| 2009/0043796 | A1 | 2/2009 | Sauermann | |
| 2009/0075605 | A1 * | 3/2009 | Yoshida | H04L 63/0272 455/91 |
| 2009/0089247 | A1 | 4/2009 | Blevins et al. | |
| 2009/0279551 | A1 | 11/2009 | Wong | |
| 2009/0304008 | A1 | 12/2009 | Kono et al. | |
| 2010/0026686 | A1 * | 2/2010 | Koo | H04L 41/22 345/440 |
| 2011/0170402 | A1 * | 7/2011 | Kikuchi | H04L 43/0829 370/216 |
| 2011/0199389 | A1 | 8/2011 | Lu | |
| 2012/0300675 | A1 | 11/2012 | Uppalli | |
| 2013/0010640 | A1 | 1/2013 | Higuchi | |
| 2013/0083693 | A1 | 4/2013 | Himura et al. | |
| 2014/0082116 | A1 | 3/2014 | Sasaki et al. | |
| 2014/0269344 | A1 * | 9/2014 | Mie | H04L 43/0811 370/242 |
| 2014/0289404 | A1 | 9/2014 | Himura et al. | |
| 2017/0134258 | A1 * | 5/2017 | Kumar | H04L 41/12 |
| 2018/0062939 | A1 | 3/2018 | Kulkarni | |
| 2019/0081866 | A1 * | 3/2019 | Torigoe | H04L 45/28 |

FOREIGN PATENT DOCUMENTS

| | | |
|---|---|---|
| JP | 2004-64204 A | 2/2004 |
| JP | 2004-80671 A | 3/2004 |
| JP | 2004-516712 A | 6/2004 |
| JP | 2005-535042 A | 11/2005 |
| JP | 2006-222808 A | 8/2006 |
| JP | 2007-221285 A | 8/2007 |
| JP | 2009-296246 A | 12/2009 |
| JP | 2009-543167 A | 12/2009 |
| JP | 2010-278858 A | 12/2010 |
| JP | 2011-217342 A | 10/2011 |
| JP | 2012-194631 A | 10/2012 |
| JP | 2013-26928 A | 2/2013 |
| JP | 2013-81053 A | 5/2013 |
| JP | 2013/131948 A | 7/2013 |
| JP | 2013-137793 A | 7/2013 |
| JP | 2013-239867 A | 11/2013 |

OTHER PUBLICATIONS

Japanese-language Office Action issued in Japanese Application No. 2018-208875 dated Jan. 21, 2020 with English translation (seven (7) pages).
Japanese-language Office Action issued in Japanese Application No. 2014-114445 dated Jan. 28, 2020 with English translation (27 pages).
E. Decker et al., "Definitions of Managed Objects for Bridges," Network Working Group, Jul. 1993, http://www.rfc-editor.org/rfc/rfc1493.txt (twenty-nine (29) pages).
International Search Report (PCT/ISA/210) issued in PCT Application No. PCT/JP2015/065954 dated Aug. 25, 2015 with English-language translation (two (2) pages).
Japanese-language Written Opinion (PCT/ISA/237) issued in PCT Application No. PCT/JP2015/065954 dated Aug. 25, 2015 with English-language translation (seven (7) pages).
Office Action issued in counterpart Singapore Application No. 11201610136U dated Oct. 10, 2017 (5 pages).
Japanese-language Office Action issued in counterpart Japanese Application No. 2014-114445 dated May 15, 2018 with English translation (five (5) pages).
Japanese-language Office Action issued in counterpart Japanese Application No. 2014-114445 dated Aug. 7, 2018 with machine English translation (four pages).
"Sun Management Center 3.6.1 User's Guide", 2010, https://docs.oracle.com/cd/E19062-01/sun.mgmt.ctr35/619-5746/web-console/index.html, with English translation (16 pages).
Indonesian-language Office Action issued in counterpart Indonesian Application No. P00201608392 dated Dec. 14, 2018 with English translation (five (5) pages).
English translation of Chinese Office Action issued in counterpart Chinese Application No. 201580029463.3 dated Feb. 2, 2019 (23 pages).
Chinese-language Office Action issued in counterpart Chinese Application No. 201580029463.3 dated Aug. 26, 2019 with English translation (43 pages).
Japanese-language Notice of Reasons for Refusal issued in counterpart Japanese Application No. 2018-208875 dated Jul. 16, 2019 with English translation (four (4) pages).
Notice of Allowance issued in counterpart U.S. Appl. No. 15/367,880 dated Jul. 25, 2019 (13 pages).

\* cited by examiner

{ #6 : mac-c, mac-b
  #7 : mac-a
  #8 : mac-r

{ #3 : mac-c
  #4 : mac-b
  #5 : mac-a, mac-r

{ #1 : mac-c
  #2 : mac-r, mac-b, mac-a

{ #9 : mac-a, mac-b, mac-c
  #10 : mac-d

| MAC ADDRESS | HOST NAME | TERMINAL TYPE | MAKER NAME | MODEL NAME | OS | IP ADDRESS | COMMENT |
|---|---|---|---|---|---|---|---|
| Mac-A | AAA | ... | ... | ... | ... | ... | ... |
| Mac-B | BBB | ... | ... | ... | ... | ... | ... |
| ⋮ | ⋮ | ⋮ | ⋮ | ⋮ | ⋮ | ⋮ | ⋮ |
| Mac-d | ddd | ... | ... | ... | ... | ... | ... |

DETAILED INFORMATION

RELAY DEVICE, PROGRAM, AND DISPLAY CONTROL METHOD

CROSS REFERENCE TO RELATED APPLICATIONS

This application is a continuation of U.S. application Ser. No. 15/367,880, filed Dec. 2, 2016, which is a continuation of PCT International Application No. PCT/JP2015/065954, filed Jun. 2, 2015, which claims priority under 35 U.S.C. § 119 from Japanese Patent Application No. 2014-114445, filed Jun. 2, 2014, the entire disclosures of which are herein expressly incorporated by reference.

BACKGROUND AND SUMMARY OF THE INVENTION

The present invention relates to supporting the management of the connection relationship of each communication device in a local area network (LAN).

In a company, for example, a communication system for the whole company is generally built by connecting the LAN provided in each base such as a branch office or the like to a communication network such as the Internet via a router. This type of LAN includes a terminal device such as a personal computer that is used by an employee or the like of the company, a printer device that is shared by a number of employees, etc., and a relay device such as a switching hub, a wireless access point device, a router, etc. for connecting the terminal device to the LAN, as components. Hereinafter, the terminal device and the relay device are collectively referred to as a "communication device" in some cases. In general, these communication devices are set as an asset management target of the company. For this reason, in the company, in preparation for accounting or like, detailed information such as the name and the installation location of the communication device is generally registered and managed in a ledger (or handwritten ledger) created by a spreadsheet software, a database, etc., for each communication device.

In the company, in many cases, a communication device is added, or the installation location of a communication device is changed in accordance with department creation or department reorganization. In this way, in a situation where an addition of a communication device or a change in the installation location of a communication device occurs frequently, a work load of the registration to the ledger or the update of the registered information becomes great, and a delay is likely to occur in the registration of the detailed information to the ledger or the update of the registered detailed information. Moreover, there may be a case where the registration to the ledger or the update of the registered information is forgotten. When the registration of the detailed information to the ledger or the update of the registered detailed information is forgotten, a discrepancy between the contents registered in the ledger and the connection relationship of each communication device in the LAN (also referred to as a network topology) occurs. In order to correct the discrepancy, effort is required such as in a reinvestigation of the installation location or the connection relationship of each communication device, etc. In addition, in the management using the ledger, when the installation location of a communication device is changed without permission, or also when a communication device that is not permitted is connected to the LAN, a discrepancy between the contents registered in the ledger and the actual connection relationship of each communication device in the LAN occurs. That is, in the management using the ledger, even though the ledger is referred to, it is not always possible to recognize the actual network topology of the LAN, and especially, in a case where the network topology can be changed, there is a problem that it is difficult to follow the changes.

The present invention has been made in consideration of the above-described problem, and an object thereof is to provide a technique capable of easily recognizing the network topology of a LAN that is connected to a communication network via a relay device, and quickly recognizing a changed portion in the network topology when a change in the network topology occurs.

In order to solve the above-described problem, the present invention provides a relay device including: network topology data acquisition means for acquiring network topology data representing a network topology that includes a connection relationship of each relay device and a connection relationship of a terminal device connected to each relay device in a local area network (LAN); and display control means for displaying, on a display device, an image of a tree structure in which each relay device included in the LAN corresponds to a node, as an image of the network topology represented by the network topology data acquired by the network topology data acquisition means, in which the display control means displays, on the display device, the image of the tree structure in which a node corresponding to a relay device designated in advance among the relay devices included in the LAN and nodes of up to directly below the designated node are set as a drawing target. Here, as a response to being given an expansion instruction for a certain node included in the drawing target, the nodes of up to directly below the node to which the expansion instruction is given may be set as a new drawing target, and the display contents of the display device may be updated. The expansion instruction for a certain node included in the drawing target is performed, for example, by an operation on the image corresponding to the node. As another aspect of the present invention, an aspect that provides a program causing a general computer such as a central processing unit (CPU) or the like to function as the network topology data acquisition means and the display control means is also considered. Still another aspect of the present invention, an aspect that provides a display control method of the relay device performing the steps corresponding to the network topology data acquisition means and the display control means is also considered.

As an example of the network topology data acquisition means, various aspects may be considered. For example, in a case where the relay device including the network topology data acquisition means is a router that connects the LAN to a communication network such as the Internet or the like, an aspect in which the network topology data acquisition means is configured by combining collecting means for collecting data representing a MAC address table and a MAC address from another relay device included in the LAN (a router, a switching hub, a wireless access point device, or the like) and network topology data generation means for generating the network topology data by analyzing the data collected by the collecting means, may be considered. In addition, an aspect in which the collecting means and the network topology data generation means are further included, in which a communication with a device that generates the network topology data is performed by the operation of each of these means, and in which means for receiving the network topology data from the device is used as network topology data acquisition means, may be also considered. When connecting the LAN to the communication network such as the Internet or the like, the router is an essential element, and the router is caused to perform the network topology display control. Thus, it is possible to achieve energy savings and cost savings, compared to an aspect in which a dedicated device for the display control is separately provided.

As a specific aspect of acquisition of the network topology data by the network topology data acquisition means, an aspect in which the network topology data is acquired according to a user instruction, an aspect in which the network topology data is periodically acquired, an aspect in which the network topology data is acquired as a response to being detected connection or disconnection of another relay device or another terminal device to a certain relay device, or the like, are included. According to the relay device, it is possible to easily recognize the network topology of the devices below the relay device designated in advance in the LAN, from the image of the tree structure displayed on the display device. Moreover, the display contents of the display device are updated, at any timing instructed by the user, periodically, or as a response to being detected the connection or the disconnection of another relay device or another terminal device to a certain relay device. Thus, the user such as a network administrator, a person in charge of accounting, or the like can quickly and easily recognize a change and a changed portion in the network topology, by viewing a change in the image of the tree structure displayed on the display device using his/her eyes. In a case where a simple network management protocol (SNMP) is used, there is a problem that only the connection relationship of equipment that supports the SNMP is recognized, or a problem that a computer which operates as an SNMP manager is newly required. Thus, the technique is different from the present invention that does not have these problems.

In addition, according to the present invention, the display control means sets the node corresponding to the relay device that is designated in advance among the relay devices included in the LAN and the nodes of up to directly below the node as a drawing target, and displays the tree structure on the display device. As a response to being given an expansion instruction for a certain node, the display control means sets the nodes of up to directly below the node to which the expansion instruction is given as a drawing target, and updates the display contents of the display device. Therefore, the following effects are exhibited. That is, as the LAN becomes large, when the whole network topology of the LAN is collectively displayed, there is a concern that the display contents of the display device will become complicated and hard to see. However, according to the present invention, a portion a user wants to recognize in detail can be designated by the user, and thus avoidance of complication of the display contents of the display device and recognition of the details of the network topology can be made compatible.

In yet another aspect of the disclosure, the relay device includes detailed information acquisition means for acquiring detailed information of each relay device in the LAN and the terminal device connected to each relay device. The display control means displays, on the display device, the image of the tree structure corresponding to the drawing target and a list image of the detailed information on the relay device and the terminal device that are directly below the designated node among the nodes included in the tree structure, side by side, and as a response to being given an expansion instruction, the display control means updates the list image of the detailed information to the list image of the detailed information on the relay device and the terminal device that are directly below the node to which the expansion instruction is given. The detailed information may include information representing at least makers of the relay device and the terminal device. According to the aspect, display of the network topology of the portion user wants to recognize in detail, and display of the detailed information of each communication device can be made compatible, while avoiding complication of the display contents of the display device. For example, when the terminal device is a server device, information indicating the operation status of the server device (for example, information representing the load of the server device such as CPU utilization efficiency, communication amount per unit time, or the like) is included in the detailed information, and thus it is possible to monitor the operation status of the server device. When the server device is crashed, the information related to the server device is not displayed, and thus it is also possible to immediately detect the server device being crashed. In addition, the communication amount per unit of terminal (or communication amount per unit time) is included in the detailed information, and thus it is possible to monitor the traffic of each terminal device. Moreover, it is possible to detect a terminal device that performs a fraud behavior such as allowing a large amount of traffic to pass (a terminal device suspected of virus infection), and thus it is also possible to block the communication of this terminal device. In addition, information indicating whether or not anti-virus software is installed (in a case where anti-virus software is installed, information indicating the version of a virus scanning definition file) is included in the detailed information. Thus, it is possible to monitor the presence or absence of the connection of a terminal device that does not satisfy a security policy related to virus checking, and it is also possible to block the communication of this terminal device.

In a case where the relay device according to the present invention includes service providing means for providing a certain service to the terminal device in the LAN according to a known communication protocol (that is, in a case where the relay device according to the present invention also functions as a server for providing the service), the detailed information acquisition means may be caused to acquire the detailed information from the terminal device by using a communication sequence according to the well-known communication protocol. According to the aspect, the relay device can acquire the detailed information of each terminal device without increasing the traffic of the communication that is performed between the relay device according to the present invention and each terminal device.

In another aspect, the relay device includes: memory means for storing one or more pieces of reference topology data as a reference for the LAN; comparison means for comparing the network topology represented by the network topology data acquired by the network topology data acquisition means, and the network topology represented by the reference topology data designated by a user among the one or more pieces of reference topology data; and notification means for notifying a difference in the network topologies, in a case where a comparison result indicating that there is a difference in the network topology represented by the network topology data acquired by the network topology data acquisition means and the network topology represented by the reference topology data is obtained by the comparison means. For example, an aspect in which the node or the leaf corresponding to the difference between the network topology represented by the reference topology data and the network topology represented by the network topology data acquired by the network topology data acquisition means is displayed on the image of the tree structure or the list image, in a different display form from other nodes or other leaves (changing of the display color or blinking), or an aspect in which a network administrator is notified by E-mail (or use of both), may be considered. According to the aspect, the user such as a network administrator or the like can quickly recognize a change from the network topology represented by the reference topology data. Here, with regard to how to generate the reference topology data, various aspects may be considered. For example, snapshot means for writing the network topology data acquired by the network topology data acquisition means in the memory means, as the reference topology data, according to a user instruction, may be further provided.

In still another aspect of the disclosure, the comparison means compares the network topology represented by the network topology data acquired by the network topology data acquisition means with the network topology represented by the reference topology data, except for a terminal device designated in advance among the terminal devices included in the LAN. According to the aspect, the terminal device such as a wireless terminal device in which connection/disconnection is supposed to occur frequently is excluded from a comparison target by the comparison means, and thus it is possible to avoid performing of an unnecessary notification.

Other objects, advantages and novel features of the present invention will become apparent from the following detailed description of one or more preferred embodiments when considered in conjunction with the accompanying drawings.

DETAILED DESCRIPTION OF THE DRAWINGS

The embodiments according to the present invention will be described with reference to the drawings.

Figures 1, 2A, 2B, 2C, 2D:
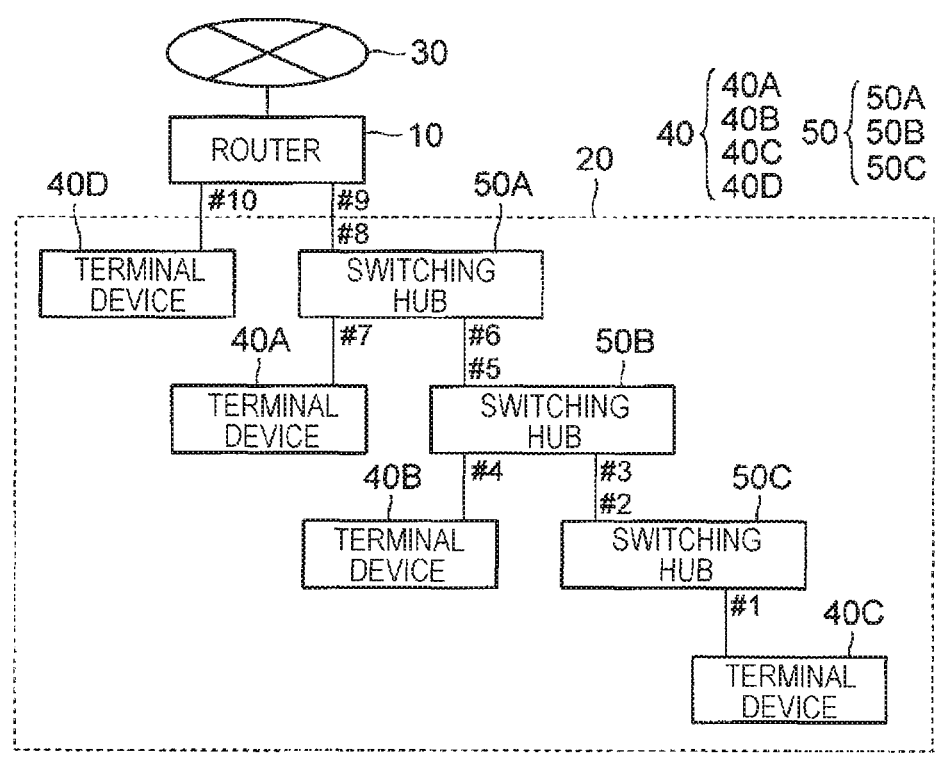
FIG. 1 illustrates a diagram of an example communication system including a router according to one or more embodiments of the present invention.
FIGS. 2A-2D illustrate diagrams of example MAC address tables stored in switching hubs according to one or more embodiments of the present invention.

FIG. 1 is a diagram illustrating a configuration example of a communication system including a router 10 that is an embodiment of a relay device according to the present invention. The communication system includes the router 10 and a LAN 20. The LAN 20 is, for example, a LAN provided at a branch of a company, and connected to a communication network 30 such as the Internet or a wide area network (WAN) via the router 10. The router 10 is a relay device for relaying a packet communication that is performed according to a communication protocol on a network layer (in this embodiment, internet protocol (IP)) between the LAN 20 and the communication network 30. The packet is a unit of transmitting and receiving of data on the network layer, and includes a header portion and a payload portion. IP addresses of the transmission source and transmission destination of the packet (a transmission source IP address and a transmission destination IP address) are written in the header portion of the packet. The IP address is a communication address to uniquely identify each of the communication devices (in the present embodiment, terminal devices 40 or switching hubs 50) on the network layer. Moreover, data on a higher layer is written in the payload portion.

As illustrated in FIG. 1, the LAN 20 includes three switching hubs (switching hubs 50A, 50B and 50C), three terminal devices (terminal devices 40A, 40B and 40C) that are respectively connected to each of the switching hubs, and a terminal device 40D connected to the router 10. As illustrated in FIG. 1, the switching hubs 50A, 50B and 50C are connected to the router 10 in a cascade. In more detail, the switching hub 50A is connected to the router 10, and the terminal device 40A and the switching hub 50B are connected to the switching hub 50A. The terminal device 40B and the switching hub 50C are connected to the switching hub 50B, and the terminal device 40C is connected to the switching hub 50C. The connection between the router 10 and each of the communication devices or the connection between the switching hubs (or terminal devices) may be wired connection or wireless connection.

Each of the terminal devices 40A, 40B, 40C and 40D is a personal computer, for example. These four terminal devices perform packet communication according to IP between the terminal device itself and other terminal devices included in the LAN 20 or between the terminal device itself and various types of server devices or terminal devices included in the communication network 30. One of these four terminal devices (in the present embodiment, the terminal device 40D) serves as a web console for the router 10 (that is, a device for providing various types of user interfaces using a web browser). Hereinafter, in a case where there is no need to distinguish each of the four terminal devices, the terminal devices are referred to as "terminal devices 40". A unique IP address is respectively assigned to each of these four terminal devices and the router 10 in advance. The IP address of the router 10 is stored in advance in each of the four terminal devices 40 as an IP address indicating a default gateway. Among these four terminal devices, the other terminal devices other than the terminal device serving as a web console for the router 10 may be a printer or a web camera. In the present embodiment, the terminal device that functions as a web console for the router 10 is included in the LAN 20 that is connected to the internet (communication network 30) via the router 10. However, the terminal device that functions as a web console may be connected to the communication network 30. As another example of the terminal device that functions as a web console, a smart phone, a tablet terminal, or the like may be also considered. The terminal device includes a control unit (for example, CPU), a communication interface unit, a memory unit (for example, RAM), and a bus that mediates data exchange between these components. Additionally, the terminal device functioning as a web console includes a display unit that functions as a web console and an operation unit such as a mouse and a keyboard, a touch panel, or the like.

Each of the switching hubs 50A, 50B and 50C is a communication device that performs relay control of data on a data link layer which is a protocol layer lower than IP. In the present embodiment, since the three switching hubs have the same configuration, in a case where there is no need to distinguish each of the switching hubs, the switching hubs are referred to as "switching hubs 50". To perform relay of data on the data link layer means to perform transmission control of a MAC frame (hereinafter, simply referred to as a "frame") on the data link layer, the MAC frame being a unit of transmitting and receiving of data. The MAC addresses of the transmission source and the transmission destination of the frame (a transmission source MAC address and a transmission destination MAC address) are written in the header portion of the frame. The MAC address is a communication address for uniquely identifying each of the communication devices on the data link layer. The router 10, each of the four terminal devices 40, and each of the five switching hubs 50 respectively have a unique MAC address. The packet transmitted from the transmission source is written in the payload portion.

The router 10 and the switching hubs 50 respectively have a plurality of ports, and other communication devices are connected to each of these ports. For example, as illustrated in FIG. 1, there is a way by which the switching hub 50A is connected to the port number 9 (in FIG. 1, referred to as #9, the same is true for the other port numbers) of the router 10, and which the terminal device 40D is connected to the port number 10 of the router 10. As in a general router or a general switching hub, a MAC address table in which the MAC address of each of the terminal devices 40 is stored is stored in the router 10 and the switching hubs 50, the terminal devices 40 being directly or indirectly via one or more other switching hubs connected to the port indicated by the port number of the router 10 or the switching hubs 50, and a port number of the router 10 or each of the switching hubs 50 being associated with a port number of each port of each of the terminal devices 40.

For example, it is assumed that the MAC addresses of the terminal devices 40A, 40B, 40C and 40D are mac-a, mac-b, mac-c and mac-d, that the MAC address of the router 10 is mac-r, and that each of the communication devices is connected as illustrated in FIG. 1. In this case, a MAC address table indicating contents illustrated in FIG. 2A is stored in the switching hub 50A. In the same manner, a MAC address table indicating contents illustrated in FIG. 2B is stored in the switching hub 50B, and a MAC address table indicating contents illustrated in FIG. 2C is stored in the switching hub 50C, respectively. The router 10 also incorporates a switching hub (not illustrated in FIG. 1), and the switching hub stores a MAC address table indicating contents illustrated in FIG. 2D. A technology in the related art such as an address resolution protocol (ARP) may be appropriately used for generating these MAC address tables and updating the contents stored in these MAC address tables. When a frame is received via any port of the router 10 and each of the switching hubs 50, the router 10 and each of the switching hubs 50 transfer the frame to the port indicating the port number that is associated with the transmission destination MAC address of the frame and stored in the MAC address table of the router 10 and the switching hubs 50 themselves. The router 10 and the switching hubs 50 perform such a process, and thus the frame transmitted from any terminal device reaches to the destination thereof.

As described above, the router 10 performs relay control of the packet transmitted from the communication network 30 to the LAN 20, and relay control of the packet transmitted from the LAN 20 to the communication network 30. For example, in a case where the transmission destination IP address of the packet received from the communication network 30 is an IP address of any one of the terminal devices 40A, 40B, 40C and 40D, the router 10 transmits the packet to the LAN 20. In a case where the transmission destination IP address of the packet is not an IP address of any one of the terminal devices 40A, 40B, and 40C, the router 10 performs a process of transmitting the packet to another router according to the contents stored in a routing table.

In the communication system illustrated in FIG. 1, the router 10 performs a process that exhibits significant features of the present embodiment, and thus it is possible to display an image representing network topology of the LAN 20 (that is, the LAN connected to the internet 30 via the router 10), on the web console. More specifically, in the present embodiment, as the image representing the network topology, an image representing physical connection relationship (that is, physical topology) between the communication devices in the LAN 20 is displayed on the web console. Therefore, a person in charge of accounting or a network administrator in the company can easily recognize the physical topology of the LAN 20 by viewing the image displayed on the web console. Hereinafter, the router 10 that exhibits significant features of the present embodiment will be mainly described.

Figure 3:
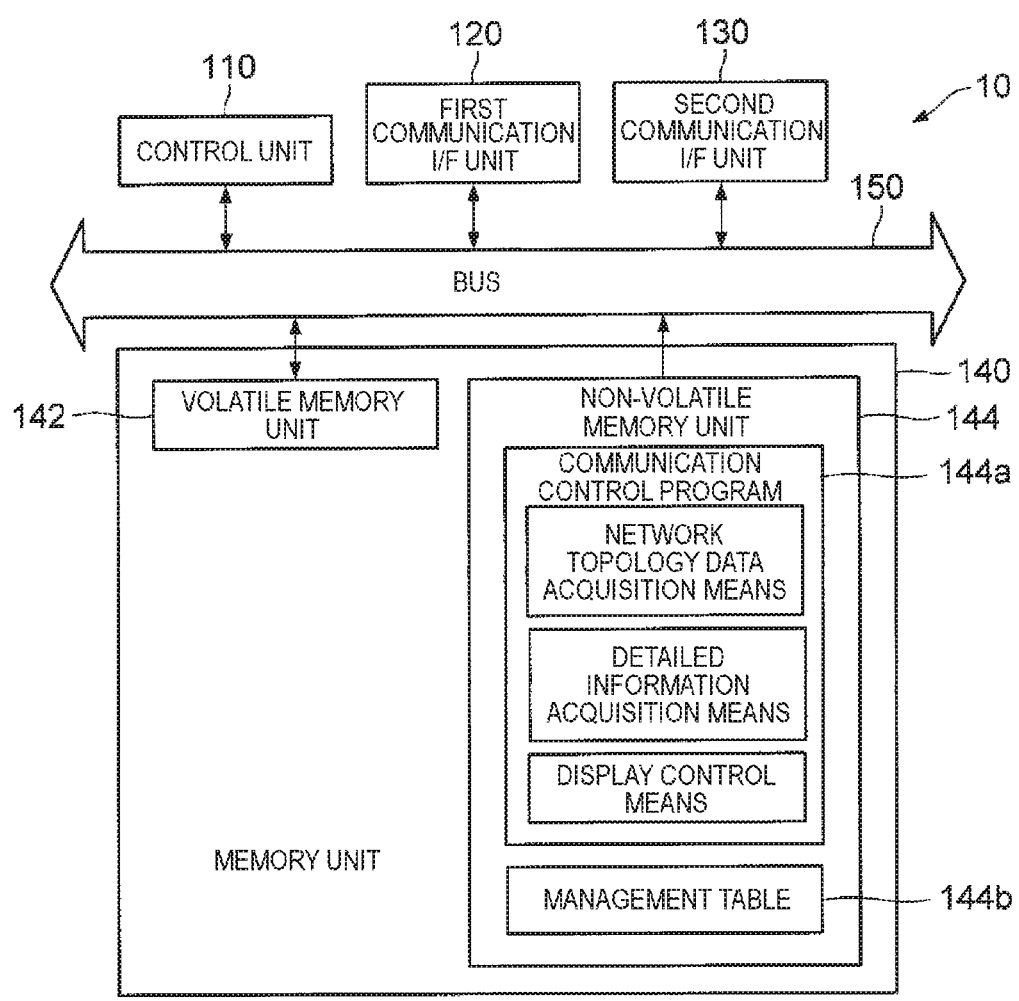
FIG. 3 illustrates a block diagram of an example router according to one or more embodiments of the present invention.

FIG. 3 is a block diagram illustrating a configuration example of the router 10.

As illustrated in FIG. 3, the router 10 includes a control unit 110, a first communication interface (hereinafter, simply referred to as "I/F") unit 120, a second communication I/F unit 130, a memory unit 140, and a bus 150 that mediates data exchange between these components.

The control unit 110 is a CPU, for example. The control unit 110 functions as a control center of the router 10 by executing a communication control program 144a stored in the memory unit 140 (more precisely, a non-volatile memory unit 144). The details of the process that is performed by the control unit 110 according to the communication control program 144a will be described later.

All of the first communication I/F unit 120 and the second communication I/F unit 130 are a network interface card (NIC). The first communication I/F unit 120 is connected to the LAN 20. More specifically, the first communication I/F unit 120 has a plurality of ports, and the switching hub 50A and the terminal device 40D are respectively connected to different communication ports. The second communication I/F unit 130 is connected to the communication network 30. The first communication I/F unit 120 and the second communication I/F unit 130 deliver the packet that is received from a network of each connection destination thereof to the control unit 110. Meanwhile, the first communication I/F unit 120 and the second communication I/F unit 130 transfer a packet that is received from the control unit 110 to the network of each connection destination thereof.

As illustrated in FIG. 3, the memory unit 140 includes a volatile memory unit 142 and a non-volatile memory unit 144. The volatile memory unit 142 is, for example, a random access memory (RAM). The volatile memory unit 142 functions as a work memory when the communication control program 144a is executed. Although the details of the volatile memory unit 142 are not illustrated in FIG. 3, a routing table is stored in the volatile memory unit 142. The non-volatile memory unit 144 is a flash ROM, for example. The communication control program 144*a* and a management table 144*b* are stored in the non-volatile memory unit 144 in advance.

The control unit 110 reads the communication control program 144*a* from the non-volatile memory unit 144 to the volatile memory unit 142, and starts the communication control program 144*a*, as a response to being supplied power (not illustrated) to the router 10 or being reset the router 10. The control unit 110 that operates according to the communication control program 144*a* performs a packet relay process and a network topology display process. Among these two processes that are performed by the control unit 110 according to the communication control program 144*a*, the packet relay process is the same as that of a general router, and thus the detailed description thereof will be omitted. Hereinafter, the network topology display process will be mainly described.

Figures 4, 5:
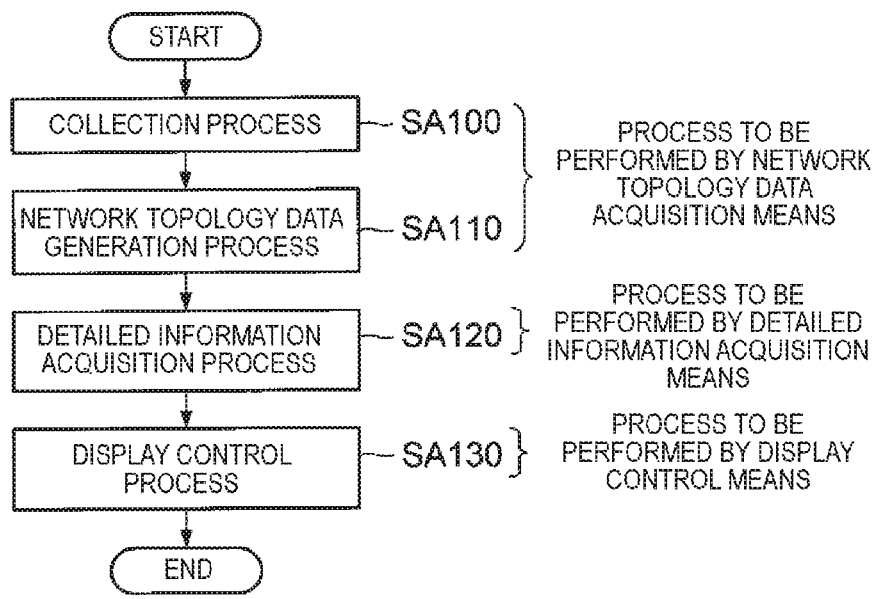
FIG. 4 illustrates a flowchart of a flow of the network topology display process that is performed by a control unit of the router according to a communication control program according to one or more embodiments of the present invention.
FIG. 5 illustrates a diagram of example contents stored in a management table stored in a non-volatile memory unit of the router according to one or more embodiments of the present invention.

The network topology display process is a process that is periodically performed at constant intervals. In this network topology display process, the control unit 110 functions as network topology data acquisition means, detailed information acquisition means, and display control means in FIG. 3. In other words, the communication control program 144*a* according to the present embodiment is a program that causes the control unit 110 to function as the network topology data acquisition means, the detailed information acquisition means, and the display control means. FIG. 4 is a flowchart illustrating a flow of the network topology display process. As illustrated in FIG. 4, the network topology display process includes a collection process SA100, a network topology data generation process SA110, a detailed information acquisition process SA120, and a display control process SA130. As illustrated in FIG. 4, the network topology data acquisition means performs the collection process SA100 and the network topology data generation process SA110, the detailed information acquisition means performs the detailed information acquisition process SA120, and the display control means performs the display control process SA130. The contents of these four processes included in the network topology display process are as follows.

The collection process SA100 is a process of communicating with each of the switching hubs included in the LAN 20, and collecting data representing the contents stored in the MAC address table of each of the switching hubs and the MAC address of each of the switching hubs (a frame in which the MAC address table is written in the payload portion thereof; hereinafter, referred to as a MAC address table reply frame) from each of the switching hubs. For example, it is considered that the control unit 110 writes a multicast address and the MAC address of the router 10 in the transmission destination address and the transmission source address of the header portion, transfers a frame in which a command for instructing the transmission of the MAC address table reply frame is written in the payload portion to the LAN 20, and causes each of the switching hubs 50 to perform a process of replying the MAC address table reply frame as a response to being received the frame.

The network topology data generation process SA110 that is performed subsequent to the collection process SA100 is a process of analyzing data collected from each of the switching hubs by the collection process SA100, generating network topology data representing the network topology of the LAN 20, and writing the network topology data in the volatile memory unit 142. In the present embodiment, as the network topology data, data representing a tree structure in which the router 10 is corresponded to a root, each of the switching hubs 50 is corresponded to a node (knob), and each of the terminal devices 40 is corresponded to a leaf, is used. The root is at the top level (the uppermost) of the tree structure, and normally, only one root exists in a single tree structure. The leaf is the end of the tree structure, and the node means neither the root nor the leaf in the tree structure. As the data representing the tree structure, a set of the structure that corresponds to each of the root, the node, and the leaf may be used, the set of the structure including a data region that stores a identifier indicating each of the devices corresponding to the structure (for example, the MAC address of the device), an upstream-side pointer indicating one device at upstream side (root side), and a downstream-side pointer indicating one device at downstream side.

For example, in the collection process SA100, it is assumed that the data representing each of the MAC address tables in FIGS. 2A to 2C is collected from each of the switching hubs 50A to 50C, and that the MAC address table in FIG. 2D is stored in the switching hub incorporated in the router 10. First, the control unit 110 detects that the terminal device having the MAC address of mac-d (that is, the terminal device 40D) is directly connected to the router 10 itself, with reference to each of the MAC address tables. The terminal device having the MAC address of mac-d can be specified as being directly connected to the router 10 itself, because the MAC address does not appear in other MAC address tables other than that of the router 10 itself. The control unit 110 stores NULL in an upstream-side pointer of the structure that corresponds to the router 10, and stores the address of the structure that corresponds to the terminal device 40D in one downstream-side pointer of the structure. Then, the control unit 110 stores the address of the structure that corresponds to the router 10 in the upstream-side pointer of the structure that corresponds to the terminal device 40D, and stores NULL in the downstream-side pointer of the structure.

Then, the control unit 110 specifies the switching hub that is directly connected to the router 10 itself. In the example illustrated in FIGS. 2A to 2D, the control unit 110 specifies the switching hub 50A as the switching hub that is directly connected to the router 10 itself, and detects that the terminal device having the MAC address of mac-a (that is, terminal device 40A) is directly connected to the switching hub 50A with reference to the MAC address table (FIG. 2A) collected from the switching hub 50A. The control unit 110 stores the address of the structure corresponding to the switching hub 50A in one downstream-side pointer in which a value is not set, among downstream-side pointers of the structure corresponding to the router 10. Then, the control unit 110 stores the address of the structure corresponding to the router 10 in the upstream-side pointer of the structure corresponding to the switching hub 50A.

Next, the control unit 110 specifies the switching hub having a port to which the MAC address of the router 10 itself and the MAC address of the terminal device that is directly connected to the switching hub that is directly connected to the router 10 itself (hereinafter, referred to as a first stage switching hub) are associated with each other, as a second stage switching hub when viewed from the router 10 itself. Hereinafter, in the same manner, the control unit 110 specifies the switching hub having a port to which the MAC address of the router 10 itself, the MAC address of the terminal device that is directly connected to the first stage switching hub, and the MAC address of the terminal device that is directly connected to the second stage switching hub are associated with each other, as a third stage switching hub when viewed from the router 10 itself. In this way, the switching hub of each stage that is connected to the router 10 in a cascade, and the terminal device that is directly connected to the switching hub are specified, and the network topology of the LAN 20 is specified. The control unit 110 updates the value of each of the upstream-side pointers and the downstream-side pointers of the structure, based on the specified result, and thus the network topology data is completed.

The detailed information acquisition process SA120 is a process of searching for the management table 144*b* using the MAC address of the communication device corresponding to each node and each leaf in the tree structure as a search key, and acquiring detailed information on the communication device. FIG. 5 is a diagram illustrating an example of the contents stored in the management table 144*b*. As illustrated in FIG. 5, the detailed information on the communication device is stored in advance in the management table 144*b* as being associated with the MAC address of the communication device included in the LAN 20. As illustrated in FIG. 5, although the detailed information according to the present embodiment includes a host name (in a case of a relay device such as a switching hub, a device name), a terminal type, a maker name, a model name, a type or name of an operating system (OS), the IP address, and information representing a comment (for example, character string information), the information constituting the detail information is not limited thereto.

For example, the detailed information on a personal computer may include a type or name of virus checking software installed on the personal computer, and information representing a version of a virus scan definition file. In the detailed information acquisition process SA120, the control unit 110 searches for the management table 144*b* using the MAC address represented by each of the data collected in the collection process and each of the MAC address stored in the MAC address table represented by the data as a search key, and reads the detailed information that is stored in the management table 144*b* as being associated with the same MAC address as the search key.

The display control process SA130 is a process of displaying an image of the tree structure representing the connection relationship of each relay device in the LAN (that is, in the present embodiment, the LAN 20) on the web console according to the network topology data generated in the network topology data generation process SA110. The network topology of the LAN is represented by the network topology data. In the present embodiment, the feature of the present invention appears in a display form of the image representing the tree structure. More specifically, the control unit 110 sets the nodes of up to directly below the node corresponding to the relay device that is designated in advance by the user (hereinafter, referred to as a drawing start point) among the relay devices included in the LAN (that is, directly connected to the drawing start point), as a drawing target, and displays the image of the tree structure up to the drawing target and the image of the list of the detailed information on the node and the leaf that are directly below the drawing start point, in parallel, on the web console. In the present embodiment, the relay device that connects the LAN 20 to the communication network 30 (the relay device at the most upstream in the LAN 20, that is, the router 10) is designated in advance by a user, as the drawing start point. Therefore, the image illustrated in FIG. 6A is displayed on the web console.

Figure 6A:
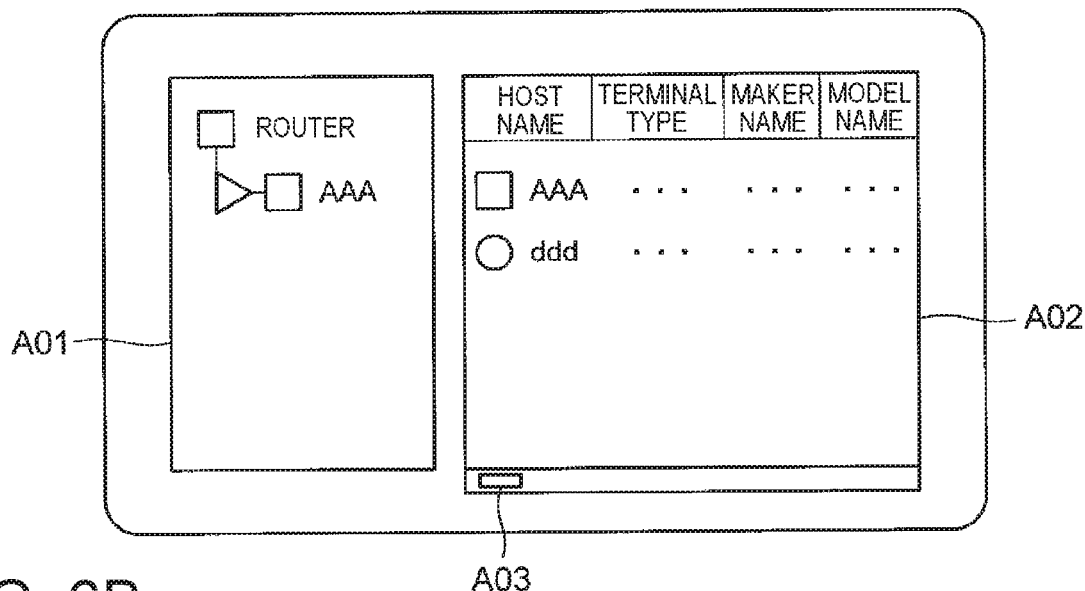
FIGS. 6A and 6B illustrate diagrams of example images displayed on a web console by the router according to one or more embodiments of the present invention.

More specifically, as illustrated in FIG. 6A, the control unit 110 displays the image of the tree structure on a first display area A01 by assigning character string information representing a device name among the detailed information to the icon representing each of the drawing start point (the router 10) and the node directly below the drawing start point. The control unit 110 displays the list of the detailed information on the node and the leaf that are directly below the drawing start point, on a second display area A02 adjacent to the first display area A01 on the right side. In a case where the sufficient width to display each information included in the detailed information cannot be assigned in the second display area A02, as illustrated in FIG. 6A, a scroll bar A03 to horizontally scroll the display contents of the second display area may be provided. In the same manner, in a case where the longitudinal width is not sufficient, a scroll bar to longitudinally scroll the display contents of the second display area may be provided, and this is the same for the first display area A01. Additionally, in the example illustrated in FIG. 6A, although a rectangular shape icon is used as an icon representing the node, and a circular shape icon is used as an icon representing the leaf, other shape icons may be used. For example, the icon representing a directory by a folder in the file manager of explorer or X window system may be used as an icon representing the node, and the icon representing a file may be used as an icon representing the leaf.

Figure 6B:
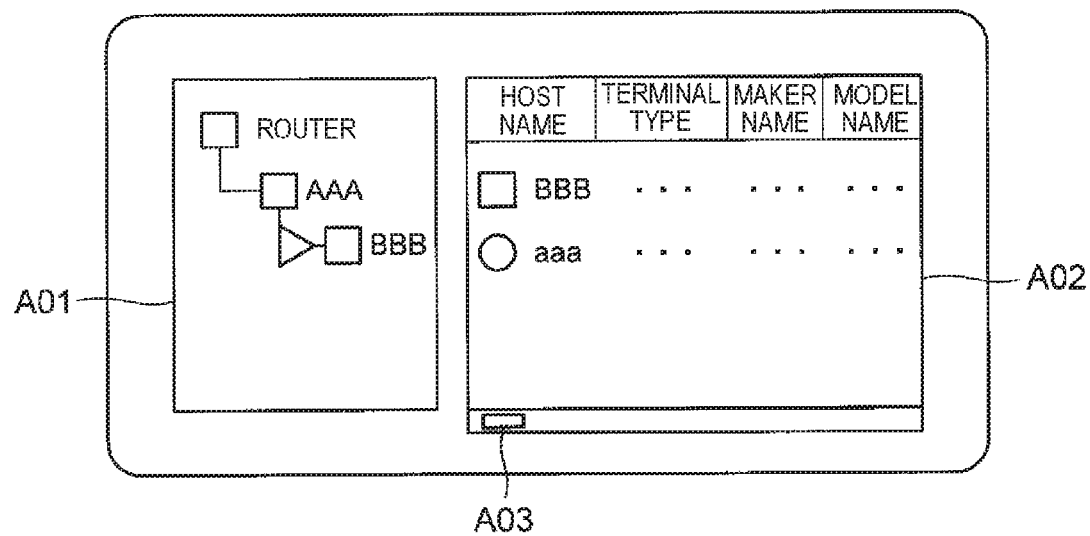

The user who views the image illustrated in FIG. 6A can give an expansion instruction of the tree structure lower than the node by specifying the icon of any node among the icons displayed in the first display area A01 or the second display area A02 with a mouse click, a touch operation, or the like. As a response to being given the expansion instruction for the node via the web console, the control unit 110 sets the nodes of up to directly below the node to which the expansion instruction is given as a drawing target, and updates the display contents of the web console. In the present embodiment, the user designates the icon of the node directly below the router 10 (that is, the node corresponding to the switching hub 50A) with a mouse click, and thus the nodes of up to directly below the node are set as a drawing target and the first display area A01 is updated. Then, in the present embodiment, the control unit 110 updates the display contents of the second display area A02 with an image of the list of the detailed information on the node and the leaf directly below the node to which the expansion instruction is given, in accordance with updating of the display contents of the first display area A01. As a result, the display contents of the first display area A01 and the second display area A02 on the display screen of the web console are updated as illustrated in FIG. 6B. In the screen illustrated in FIG. 6A or FIG. 6B, instead of updating the display contents of the second display area A02 by specifying a triangle-shaped icon given in front of the icon indicating a node in the first display area A01 with a mouse click or the like, it is possible to display again the image of the tree structure by setting the nodes of up to directly below the node in the first display area A01 as a drawing target.

In this configuration, according to the present embodiment, it is possible to easily recognize the network topology of the LAN 20 by viewing the image of the tree structure displayed on the display device of the terminal device 40D serving as the web console for the router 10. In addition, according to the present embodiment, the user can recognize the network topology of the LAN 20 by designating a portion user wants to recognize in detail in the network topology of the LAN 20. In the present embodiment, although a case where the relay device at the most upstream of the LAN 20 is designated in advance as a drawing start point is described, another relay device (that is, any one of the switching hubs 50A to 50C) may be designated. In addition, according to the present embodiment, the network topology display process is periodically performed at constant intervals. Thus, when the change in the network topology occurs, it is possible to quickly recognize the changed portion.

According to the present embodiment, the image representing the network topology is displayed according to the stored contents of the MAC address table that is stored in each of the switching hubs 50. Therefore, even in a case where a communication device that performs communication without passing through the router 10 (terminal device or the like that only communicates with another terminal device connected to each of the switching hubs 50 that is the connection destination of the terminal device itself) is included in the LAN 20, it is possible to display the image of the network topology including the communication device on the web console.

As described above, although one embodiment of the present invention has been described, the following additional embodiments and/or modifications may be naturally added to the embodiment.

In one embodiment, although a case where the relay device under the control of the router 10 (relay device included in the LAN that is connected to the communication network 30 via the router 10) is a switching hub has been described, the relay device under the control of the router 10 may be a router or a wireless access point device. In the above embodiment, the image of the tree structure representing the physical connection relationship (physical topology) of each of the relay devices in the LAN 20 connected to the communication network 30 via the router 10 is displayed on the terminal device that functions as the web console of the router 10. However, the image of the tree structure representing the logical connection relationship (virtual local area network (VLAN) group; hereinafter, referred to as a logical topology) of each of the relay devices in the LAN 20 may be displayed on the terminal device that functions as the web console of the router 10. The VLAN means a virtual network formed by grouping communication devices belonging to the LAN according to the port, the MAC address, and the communication protocol of the relay device such as the switching hub, and the VLAN group means each group obtained by the grouping. The logical topology is not limited to the VLAN group, and may be a connection relationship focusing on the flow of data. The point is, an aspect in which the image of the tree structure representing the network topology of the LAN 20 is displayed on the terminal device functioning as the web console the router 10 may be provided. The network topology to be displayed may be a physical topology or a logical topology. The network topology to be displayed also may be switched between the physical topology and the logical topology according to the instruction of the user, or the like.

In another embodiment, an application example to the router according to the present invention has been described. This is because the router is an essential element when connecting the LAN to the WAN such as Internet, and the network topology display process is performed by the router. Therefore, in a case where SNMP is used, it is unnecessary to separately provide a dedicated device such as a SNMP manager, and thus it is possible to achieve energy saving and cost saving. However, the relay device to which the present invention is applied is not limited to the router, and the present invention may be applied to a switching hub or a wireless access point device under the control of the router. For example, in a case where the present invention is applied to a switching hub, the specification of the network topology and the display of the specification results may be performed on a set of another terminal device and another relay device (a switching hub or a wireless access point device) that are directly or indirectly connected to the downstream of the switching hub (the opposite side of the router). Moreover, the detailed information acquisition process SA120 according to the embodiment is not necessarily essential, and may be omitted. This is because even though the detailed information acquisition process SA120 is omitted, the image of the tree structure representing the network topology can be displayed. In a case where the detailed information acquisition process SA120 is omitted, as an identifier to be assigned to each icon in the tree structure, the MAC address of the device corresponding to the icon may be used. Additionally, in the embodiment, the display control of the image representing the network topology of the LAN 20 is performed by the router 10 that connects the LAN 20 to the communication network 30. However, the display control of the image representing the network topology of another LAN different from the LAN 20 can be also performed by the router 10. The point is, as long as the router 10 can collect the data representing the contents stored in the MAC address table from each relay device included in the LAN, each relay device being as a display control target of the image representing the network topology, it is not necessary that the router 10 is directly connected to the LAN. Even in a case where the router 10 is not connected to the LAN as a target of the display control of the image representing the network topology, among the relay devices included in the LAN, the relay device designated in advance by the user is set as a drawing start point, and the nodes of up to directly below the drawing start point are set as a drawing target. Thus, the display control of the image representing the tree structure may be started.

In yet another embodiment, an aspect in which the contents stored in the MAC address table of each of the switching hubs 50 are periodically collected has been described. However, an aspect in which the contents stored in the MAC address table are collected according to the user instruction given via the web console may be adopted. According to the aspect, the network topology data can be generated at any timing, and thus it is possible to perform the display of the image representing the network topology. Moreover, an aspect in which the contents stored in the MAC address table are collected as a response to being detected the connection (link-up) or the disconnection (link-down) of the terminal devices 40 or other switching hubs 50 to each of the switching hubs 50 may be adopted. In the same manner, an aspect in which the contents stored in the MAC address table are collected as a response to being detected the connection (link-up) or the disconnection (link-down) of the terminal devices 40 or the switching hubs 50 to the router 10 may be adopted. This is because when the connection or the disconnection of the terminal devices 40 or the switching hubs 50 occurs, the change of the network topology always occurs. For the detection of link-up and link-down of the terminal devices 40 to the switching hubs 50, a well-known technique may be appropriately used. The aspects may be used in combination of all or two of the aspect in which the contents stored in the MAC address table of each of the switching hubs 50 are periodically collected, the aspect in which the contents stored in the MAC address table are collected as a response to being detected the connection (link-up) or the disconnection (link-down) of the terminal devices 40 to the switching hubs 50, and the aspect in which the contents stored in the MAC address table are collected according to the user instruction.

In a further embodiment, the detailed information on each communication device included in the LAN 20 is stored in advance in the management table 144*b*. However, the detailed information may be updated or additionally registered by the input operation on the second display area A02 of the screen illustrated in FIG. 6A or FIG. 6B. In addition, there is no need to store the management table 144*b* in the non-volatile memory unit 144 of the router 10, and the management table 144*b* may be stored in another device as long as the management table 144*b* is freely accessible by the control unit 110 during performing of the detailed information acquisition process SA120. Moreover, the contents stored in the management table 144*b* may be output as a file such as a CSV format file, and the file may be input to another device. In contrast, a CSV format file generated by another device may be imported as the management table 144*b*. For example, when another device is an asset management database server or the like, it is possible to cooperate with an asset management system. When another device is another router installed in the company (a router having the same configuration as the router 10), single management table can be repeatedly used between the routers. When the detailed information can be acquired by the communication between the router and the switching hubs 50 or between the router and the terminal devices 40, there is no need to use the management table 144*b*. The maker of each communication device can be specified from the MAC address of the communication device, and thus information representing at least makers can be acquired as the detailed information.

In a case where the relay device according to the present invention includes service providing means for providing a certain service to the terminal device according to a well-known communication protocol (that is, in a case where the relay device has a certain server function), the detailed information may be acquired from the terminal device using the communication according to the communication protocol. For example, in a case where a dynamic host configuration protocol (DHCP) is used for assigning an IP address to the terminal device and the relay device according to the present invention has a DHCP server function, the detailed information of the terminal device is acquired by using a DHCP mechanism. More specifically, a DISCOVER message in which the detailed information such as the host name (device name) or the used class (OS) name of the terminal device is given as an option is transmitted to the terminal device to which the IP address is assigned using the DHCP. Here, the DISCOVER message is a communication message requesting the DHCP server to initiate a communication sequence for assigning the IP address using the DHCP. When the DISCOVER message is received, the relay device acquires the detailed information that is given as an option in the DISCOVER message, and transmits an OFER message to the transmission source of the DISCOVER message according to the DHCP. The management table 144*b* may be generated by writing the detailed information acquired by the procedure in the memory unit 140 by being associated with the MAC address of the transmission source of the DISCOVER message (or the contents stored in the management table 144*b* that depend on the detailed information may be updated). In addition, the service provided by the service providing means (or the communication protocol to realize the service providing) is not limited to the DHCP. For example, in the case of a domain name service (DNS) is used as the communication protocol to realize the service (that is, in a case where the relay device according to the present invention also serves as a DNS server), an option region for giving the detailed information of the terminal device may be provided in the communication message of the DNS, and the terminal device may transmit the communication message in which the detailed information of the terminal device itself is written in the option region. The relay device may acquire the detailed information by reading the detailed information written in the option region. According to the aspect, the relay device can acquire the detailed information of each terminal device without increasing the traffic of the communication performed between the relay device according to the present invention and the terminal device.

Figure 7:
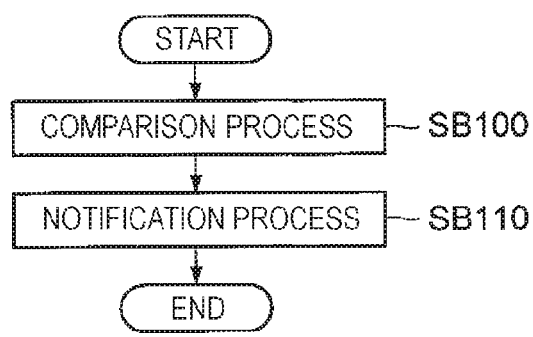
FIG. 7 is another flow chart according to one or more embodiments of the present invention.

In another aspect, reference topology data representing the network topology as a reference for the LAN 20 may be stored in the memory unit 140 (more specifically, the non-volatile memory unit 144), and as illustrated in FIG. 7, the control unit 110 may be caused to perform a comparison process SB100 for comparing the network topology represented by the reference topology data and the network topology represented by the network topology data generated by the last network topology data generation process SA110, and a notification process SB110 for notifying a difference in both topologies in a case where there is a difference in both topologies (that is, the control unit 110 may be caused to function as comparison means for performing the comparison process SB100 and notification means for performing the notification process SB110). Aside from the network topology display process illustrated in FIG. 4, the control unit 110 may be caused to perform the comparison process SB100 and the notification process SB110, as a response to being given an expansion instruction via the web console from the user. Moreover, in a case where the setting to perform the comparison process SB100 and the notification process SB110 is made, the control unit 110 may be caused to perform the comparison process SB100 and the notification process SB110 in parallel with the network topology display process illustrated in FIG. 4. As a notification form of the difference in the notification process SB110, a form in which the node or the leaf corresponding to the difference between the network topology represented by the reference topology data and the network topology represented by the network topology data is displayed on the image of the tree structure or the list image in a different display form from other nodes or leaves (changing of the display color or blinking), or a form by which an mail or the like to notify the difference may be transmitted to a network administrator, may be considered. In addition, the control unit 110 may be caused to perform a process of writing the information representing the node or the leaf corresponding to the difference in the non-volatile memory unit 144, every time the difference is detected in the comparison process SB100.

According to the aspect, in a case where the terminal devices 40 that are included in the network topology represented by the reference topology data are not represented in the network topology represented by the network topology data generated by the last network topology data generation process SA110, in contrast, in a case where the terminal devices 40 that are not included in the network topology represented by the reference topology data are represented in the network topology represented by the network topology data generated by the last network topology data generation process SA110, the notification is performed. In the former case, it means that the terminal device to be originally connected to the LAN 20 is not connected to the LAN 20. When the information representing the installation department or the installation location of each terminal device is included in the detailed information, in a case where the notification in the former case is performed, it is confirmed that whether or not there is a reasonable reason for that the connection is not detected such as disconnection of the power supply of the terminal device, by inquiring of the installation department of the terminal device the reason. Thus, it is possible to quickly respond in a case where a failure of the terminal device or a theft occurs. On the other hand, in the latter case, the entry of the terminal device as personal belongings is considered, and thus it is possible to quickly respond to entry of personal belongings or the like by inquiring of the department. In addition, it is considered that the link-up or the link-down of a specific terminal device is detected by using the network topology represented by the reference topology data as a reference, and the user such as the network administrator is notified by mail or the like.

Here, as a specific generation aspect of the reference topology data, various aspects are considered. For example, an aspect in which the control unit 110 is caused to function as snapshot means for storing the network topology data representing the network topology at the timing of acquiring the instruction as the reference topology data as a response to being given an instruction to generate the reference topology data via the web console (for example, a setting button provided in the web console is pressed), is considered. The number of the reference topology data stored in the memory unit 140 is not limited to one. A plurality of the reference topology data representing each different network topology may be stored in memory unit 140, and the reference topology data as a reference in the comparison process may be selected by the user from the plurality of the reference topology data. For example, the user such as a network administrator or the like can switch the content to be detected according to the time zone, by selectively using the reference topology data for night time at which there is no employees and the reference topology data for office time at which the terminal devices 40 are used by employees.

Moreover, the comparison process may be performed except the terminal device designated in advance by the user among terminal devices 40 included in the LAN 20. According to this aspect, the terminal devices 40 such as a wireless terminal device in which connection/disconnection is supposed to occur frequently are excluded from a comparison target, and thus it is possible to avoid performing of an unnecessary notification.

In yet a further embodiment, the communication control program 144*a* causing the control unit 110 of the router 10 to perform the network topology display process which exhibits significant features of the present invention is stored in advance in the non-volatile memory unit 144 of the router 10. However, the communication control program 144*a* may be distributed by being written in computer-readable recording medium such as a compact disk-read only memory (CD-ROM) or the like, or may be distributed by downloading via an electrical communication line such as the Internet or the like. The control unit of a general relay device such as a router is operated according to the program distributed in the manner, and thus the relay device can function as the relay device according to the present invention. In addition, it is considered that a program causing the CPU to function as the network topology data acquisition means and the display control means according to the embodiment is installed in a personal computer or the like, and that the personal computer is caused to function as a network topology display device.

The following is a list of reference numerals and corresponding features. 10: router, 110: control unit, 120: first communication I/F unit, 130: second communication I/F unit, 140: memory unit, 142: volatile memory unit, 144: non-volatile memory unit, 144*a*: communication control program, 144*b*: management table, 150: bus, 20: LAN, 30: communication network, 40, 40A, 40B, 40C, 40D: terminal device, 50, 50A, 50B, 50C: switching hub The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A router for connecting to a display device, the router comprising:
   a processor and a memory storing instructions, the processor executing the stored instructions to:
      acquire network topology data representing a network topology that includes a connection relationship of each relay device and a connection relationship of a terminal device connected to each relay device in a local area network (LAN);
      display, on the display device, an image of a tree structure in which each relay device included in the LAN corresponds to a node, as an image of the network topology represented by the acquired network topology data; and
      display, on the display device, the image of the tree structure in which a node corresponding to a relay device designated in advance among the relay devices included in the LAN and nodes of up to directly below the designated node are set as a drawing target;
   a plurality of ports for connecting to other communication devices;
   a first MAC address table in which MAC addresses of terminal devices are stored in association with corresponding port numbers of the plurality of ports connected to the terminal devices via one or more relay devices or without any relay devices, wherein
   the processor further executes the stored instructions to:
      collect, from each relay device, a second MAC address table in which MAC addresses of terminal devices are stored in association with corresponding port numbers of the plurality of ports connected to the terminal devices via one or more relay devices or without any relay devices; and
      acquire the network topology data by specifying a relay device located at a downstream side of the router based on the first MAC address table of the router and the second MAC address table of each relay device.

2. The router according to claim 1, wherein, as a response to being given an expansion instruction for a certain node included in the drawing target, the processor further executes the stored instructions to display contents of the display device by setting nodes of up to directly below the node to which the expansion instruction is given as a new drawing target.

3. The router according to claim 2, wherein the processor further executes the stored instructions to:

acquire detailed information of each relay device in the LAN and the terminal device connected to each relay device;

display, on the display device, the image of the tree structure corresponding to the drawing target and a list image of the detailed information on the relay device and the terminal device that are directly below the designated node among the nodes included in the tree structure, side by side; and as a response to being given the expansion instruction, update the list image of the detailed information to a new list image of the detailed information on the relay device and the terminal device that are directly below the node to which the expansion instruction is given.

4. The router according to claim 3, wherein the detailed information includes information representing at least makers of the relay device and the terminal device.

5. The router according to claim 1, wherein the processor further executes the stored instructions to acquire the network topology data, according to a user instruction, periodically, or as a response to being detected connection or disconnection of another relay device or another terminal device to a certain relay device.

6. The router according to claim 1, further comprising:
a memory area for storing one or more pieces of reference topology data as a reference for the LAN, wherein the processor further executes the stored instructions to:
compare the network topology represented by the acquired network topology data, and the network topology represented by the reference topology data designated by a user among the one or more pieces of reference topology data; and
notify a difference in the network topologies, in a case where a comparison result indicating that there is a difference in the network topology represented by the acquired network topology data and the network topology represented by the reference topology data is obtained by comparison.

7. The router according to claim 6, wherein the processor further executes the stored instructions to:
write the acquired network topology data in the memory area, as the reference topology data, according to a user instruction.

8. The router according to claim 6, wherein the processor executes the stored instructions to compare the network topology represented by the acquired network topology data with the network topology represented by the reference topology data, except for a terminal device designated in advance among the terminal devices included in the LAN.

9. The router according to claim 2, wherein the expansion instruction for a certain node included in the drawing target is performed by an operation on the image corresponding to the certain node.

10. A display control method of a switching hub for connecting to a display device, the method comprising:
acquiring network topology data representing a network topology that includes a connection relationship of each relay device and a connection relationship of a terminal device connected to each relay device in a local area network (LAN); and
displaying, on the display device, an image of a tree structure in which a node corresponding to the relay device designated in advance among the relay devices included in the LAN and nodes of up to directly below the designated node are set as a drawing target, based on the acquired network topology data, wherein the switching hub includes a plurality of ports for connecting to other communication devices; and a first MAC address table in which MAC addresses of terminal devices are stored in association with corresponding port numbers of the plurality of ports connected to the terminal devices via one or more relay devices or without any relay devices, the method of the switching hub further comprising:
collecting, from each relay device, a second MAC address table in which MAC addresses of terminal devices are stored in association with corresponding port numbers of the plurality of ports connected to the terminal devices via one or more relay devices or without any relay devices; and
acquiring the network topology data by specifying a relay device located at a downstream side of the router based on the first MAC address table of the router and the second MAC address table of each relay device.

11. The method according to claim 10, wherein, as a response to being given an expansion instruction for a certain node included in the drawing target, contents of the display device are displayed by setting nodes of up to directly below the node to which the expansion instruction is given as a new drawing target.

12. The method according to claim 11, further comprising:
acquiring detailed information of each relay device in the LAN and the terminal device connected to each relay device;
displaying, on the display device, the image of the tree structure corresponding to the drawing target and a list image of the detailed information on the relay device and the terminal device that are directly below the designated node among the nodes included in the tree structure, side by side; and
as a response to being given the expansion instruction, updating the list image of the detailed information to a new list image of the detailed information on the relay device and the terminal device that are directly below the node to which the expansion instruction is given.

13. The method according to claim 12, wherein the detailed information includes information representing at least makers of the relay device and the terminal device.

14. The method according to claim 10, wherein the network topology data is acquired according to a user instruction, periodically, or as a response to being detected connection or disconnection of another relay device or another terminal device to a certain relay device.

15. The method according to claim 10, further comprising:
storing one or more pieces of reference topology data as a reference for the LAN;
comparing the network topology represented by the acquired network topology data, and the network topology represented by the reference topology data designated by a user among the one or more pieces of reference topology data; and
notifying a difference in the network topologies, in a case where a comparison result indicating that there is a difference in the network topology represented by the acquired network topology data and the network topology represented by the reference topology data is obtained by comparison.

16. The method according to claim 15, further comprising:

writing the acquired network topology data in the memory area, as the reference topology data, according to a user instruction.

17. The method according to claim 15, the network topology represented by the acquired network topology data is compared with the network topology represented by the reference topology data, except for a terminal device designated in advance among the terminal devices included in the LAN.

18. The method according to claim 11, wherein the expansion instruction for a certain node included in the drawing target is performed by an operation on the image corresponding to the certain node.

\* \* \* \* \*